(12) United States Patent
Pfeiffer et al.

(10) Patent No.: US 7,379,808 B2
(45) Date of Patent: May 27, 2008

(54) LONGITUDINAL DYNAMICS CONTROL SYSTEM IN MOTOR VEHICLES

(75) Inventors: Andreas Pfeiffer, Holzkirchen (DE); Peter Wanner, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/785,731

(22) Filed: Apr. 19, 2007

(65) Prior Publication Data

US 2007/0198161 A1   Aug. 23, 2007

Related U.S. Application Data

(63) Continuation of application No. PCT/EP2005/010554, filed on Sep. 30, 2005.

(30) Foreign Application Priority Data

Oct. 20, 2004   (DE) ................. 10 2004 051 004

(51) Int. Cl.
*B60K 31/00* (2006.01)

(52) U.S. Cl. .......................... 701/93; 701/70

(58) Field of Classification Search ............. None
See application file for complete search history.

(56) References Cited

U.S. PATENT DOCUMENTS 6,061,623 A * 5/2000 Hippley et al. .............. 701/93

6,078,859 A * 6/2000 Jastrzebski et al. .......... 701/93
6,360,154 B1   3/2002 Krenn et al.
2003/0216854 A1   11/2003 Katakura et al.
2004/0168843 A1   9/2004 Lankes et al.
2005/0261107 A1   11/2005 Lankes et al.

FOREIGN PATENT DOCUMENTS

| DE | 100 55 868 A1 | 10/2001 |
|----|---------------|---------|
| DE | 101 17 162 A1 | 10/2002 |
| DE | 101 43 736 C1 | 9/2003 |
| DE | 102 21 341 A1 | 11/2003 |
| DE | 102 44 519 A1 | 4/2004 |
| DE | 103 10 860 A1 | 9/2004 |
| DE | 10 2004 016 513 A1 | 10/2005 |
| EP | 1 078 804 B1 | 2/2001 |
| EP | 1 362 736 A2 | 11/2003 |

* cited by examiner

*Primary Examiner*—Michael J. Zanelli
(74) *Attorney, Agent, or Firm*—Crowell & Moring LLP

(57) ABSTRACT

A system for controlling longitudinal dynamics in motor vehicles by which, starting from an actual vehicle velocity, a new desired vehicle velocity is to be adjusted. A functional module is provided by which a desired wheel torque course is determined for reaching the desired vehicle velocity, the course at least in a main section being proportional to the reciprocal value of the vehicle velocity and which is outputted to potential regulating systems for the conversion of the desired wheel torque course.

17 Claims, 2 Drawing Sheets

LONGITUDINAL DYNAMICS CONTROL SYSTEM IN MOTOR VEHICLES

This application is a Continuation of PCT/EP2005/010554, filed Sep. 30, 2005, and claims the priority of DE 10 2004 051 004.0, filed Oct. 20, 2004, the disclosures of which are expressly incorporated by reference.

BACKGROUND AND SUMMARY OF THE INVENTION

The invention relates to a longitudinal dynamics control system in motor vehicles.

In the case of motor vehicles having driver assistance systems, particularly for controlling longitudinal dynamics, by which a predefined velocity or a predefined distance from the vehicle driving ahead has to be kept constant, methods are known by which a drive system and/or a wheel braking system are controlled for reaching a desired vehicle velocity. Increasingly, this control takes place by way of the output of a desired wheel torque (or of a desired cumulative wheel torque or a tractive power). With respect to the technical background concerning a potential conversion (implementation) of a desired wheel torque (or a tractive power demand), which can be emitted, for example, by a driver assistance system as a prompt to a drive system, reference is made to German Patent Document DE 101 17 162 A1. The drive system normally consists of an electronically controlled engine (such as an internal-combustion engine) as well as of a transmission which, as required, can also be electronically controlled. The fraction of the wheel torque (cumulative wheel torque) acting from the drive system is therefore obtained as a result of an engine or internal-combustion engine torque at a certain transmission ratio.

Currently implemented driver assistance systems, such as the ACC—Adaptive Cruise Control—or a cruise control of any type predefine their request to the control device of the internal-combustion engine and/or the control device of an automatic transmission by way of a desired predefinition of the clutch torque. This requires the knowledge of the normal resistances and the actual ratio in the transmission line (actual gear and ratio of the differential of the driven axle). The above-described active chain of the driver assistance system—desired predefinition in the direction of the internal-combustion engine, the conversion of the predefinition by the internal-combustion engine and the reaction of the transmission to this conversion has various effects which lead to the following disadvantages:

Long reaction time of the transmission. Downshifting often takes place only when it is no longer necessary.
Superfluous shifting; that is, in certain situations, a downshifting takes place which would not be necessary because the currently available engine torque is sufficient.
Pendulum shifting; that is, frequent down- and upshifting within a short period of time. These may occur particularly at transitions between the plane and a slope or gradient.

The above-mentioned effects are uncomfortable to the driver because they are unexpected, since the gear shifting differs from that which is carried out without a driver assistance system.

It is an object of the invention to provide a system for controlling longitudinal dynamics which results in an increase of comfort and control speed.

In the case of the system in motor vehicles for controlling longitudinal dynamics by which, starting from an actual vehicle velocity, a new desired vehicle velocity is to be adjusted, a functional module is provided by which a desired wheel torque course predefined for reaching the desired vehicle velocity is determined, which is predefined at least in a main section proportionally to the reciprocal value of the vehicle velocity (compare tractive power hyperbolas) and which is output to potential regulating systems (such as the drive system and/or the braking system) for the conversion of the desired wheel torque course. As a result, the desired predefinition of control of the longitudinal dynamics is adapted, for example, to a traction-power-controlled drive system, as described, for example, in German Patent Document DE 101 17 162 A1.

Furthermore, the functional module is preferably further developed such that at least the main section of the desired wheel torque course is selected between a maximally possible desired wheel torque course and the wheel torque required for keeping the desired vehicle velocity constant.

The desired wheel torque course may be composed of a starting section, a main section and an end section, the starting and the end section representing transition sections with finite gradients.

The starting point of the desired wheel torque course is the wheel torque required for keeping the actual vehicle velocity constant, preferably while taking into account interfering forces or normal resistances. The end point of the desired wheel torque course is the wheel torque required for keeping the desired vehicle velocity constant, also preferably while taking into account interfering forces or normal resistances.

The invention is based on the following recognitions:

As a result of a repositioning of the interface between the system for controlling longitudinal dynamics (driver assistance system) and the drive system (consisting of an arbitrary motor (for example, an internal-combustion engine, a hydrogen drive, an electric motor, etc.) and, as required, an automatic transmission (or an automated manual transmission) to wheel torques, the drive system can first determine which combination of a gear predefinition and of a clutch torque predefinition best converts the momentary wheel torque predefinition. By means of a tractive-power-controlled or wheel-torque-controlled interface to the drive system, the driver assistance system generated a desired predefinition in the form of a wheel torque or a desired wheel torque course proportionally to the reciprocal value of the vehicle velocity or corresponding to the tractive power hyperbolas known from German Patent Document DE 101 17 162 A1. The functional module according to the invention may, for example, be integrated in an electronic control device assigned to the system for controlling longitudinal dynamics, which communicates, for example, with an engine control device and/or a transmission control device. However, the totality of the functional modules in the control devices mentioned here may also be combined in a single central control device or central computer. In this case, the functional modules communicate with one another.

Other objects, advantages and novel features of the present invention will become apparent from the following detailed description of the invention when considered in conjunction with the accompanying drawings.

DETAILED DESCRIPTION

Figure 1:
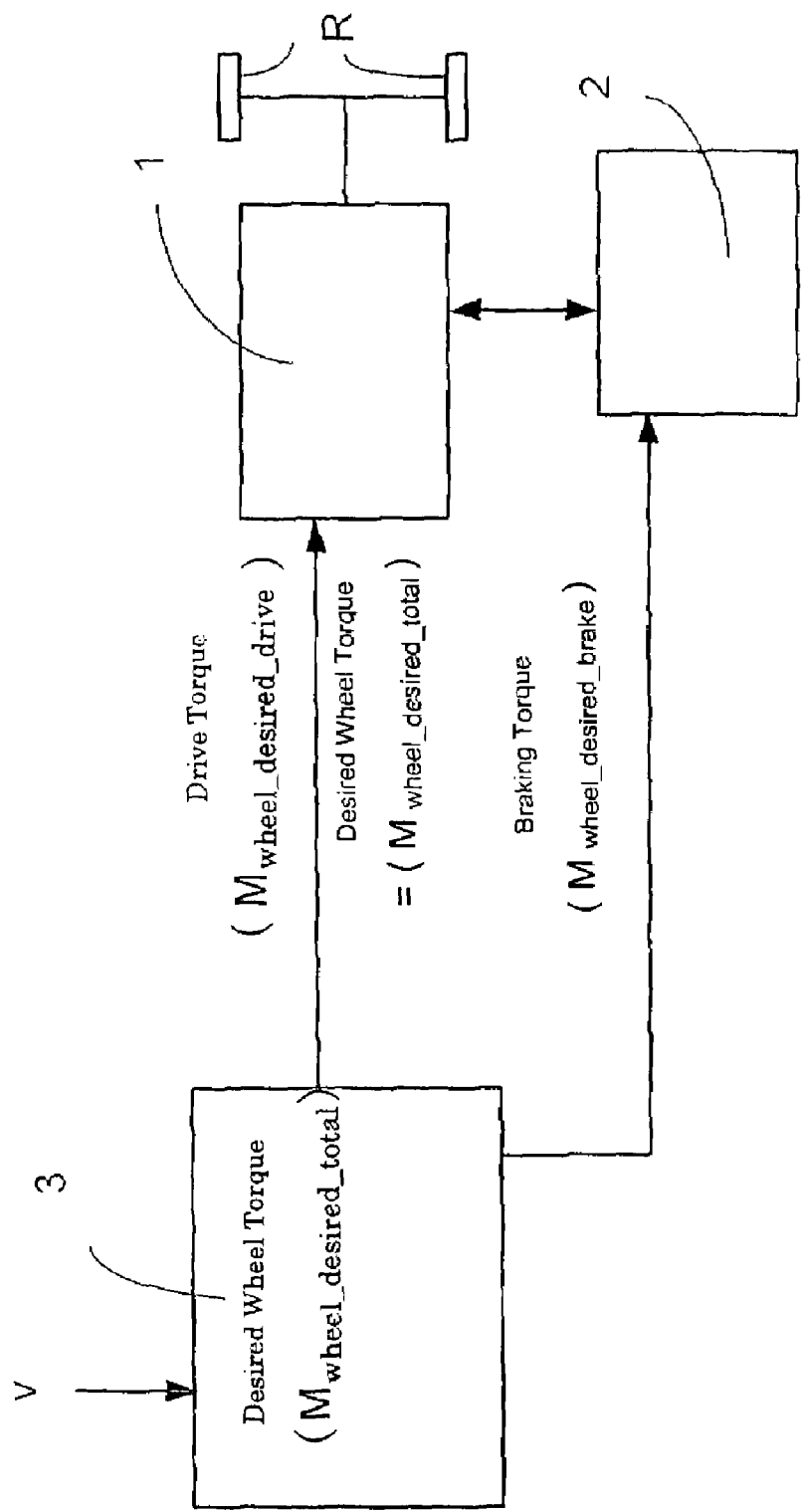
FIG. 1 is a schematic illustration of a control system in accordance with an embodiment of the present invention.

FIG. 1 illustrates a vehicle system including a drive system 1, a braking system 2 and a driver assistance system 3 for controlling longitudinal dynamics. The systems 1 to 3 have, for example, one electronic control device respectively, which are conventionally connected with one another by way of data bus systems. The functional module according to the invention is, for example, integrated in the control device of the driver assistance system 3.

In the present embodiment, the driver assistance system 3, for achieving a predefined higher desired vehicle velocity $v_{desired}$, is to determine a desired wheel torque $M_{wheel\_desired\_total}$ required for this purpose, which is to have an effect on the driving wheels R in the form of a desired tractive power.

The desired vehicle velocity $v_{desired}$ may, for example, either be the desired velocity adjusted by the driver by way of an operating element assigned to the system for controlling longitudinal dynamics or a vehicle velocity predefined by the system for controlling longitudinal dynamics itself as a function of specific operating parameters. In particular, a desired vehicle velocity $v_{desired}$ predefined by the system for controlling longitudinal dynamics may be the constant vehicle velocity to be predefined during a sequential trip or a fictitious constant vehicle velocity (for example, a maximally possible vehicle velocity) when an acceleration is predefined, for example, by means of a system according to German Patent Document DE 102004016513, which is not a prior publication.

The desired wheel torque $M_{wheel\_desired\_total}$ to be applied to the wheels R of a motor vehicle can basically consist of a drive torque $M_{wheel\_desired\_drive}$ and/or a braking torque $M_{wheel\_desired\_brake}$. The following is b on an increase of the tractive power, thus, on a positive desired drive torque, for which no braking torque is required.

For this purpose, a functional module in the control device of the driver assistance system 3 emits a prompt to a control device of the drive system 1, in which the desired wheel torque $M_{wheel\_desired\_total}$ is emitted as a desired drive torque $M_{wheel\_desired\_drive}$. As a function of additional operating parameters, the drive system 1 decides how this drive torque is adjusted.

Figure 2:
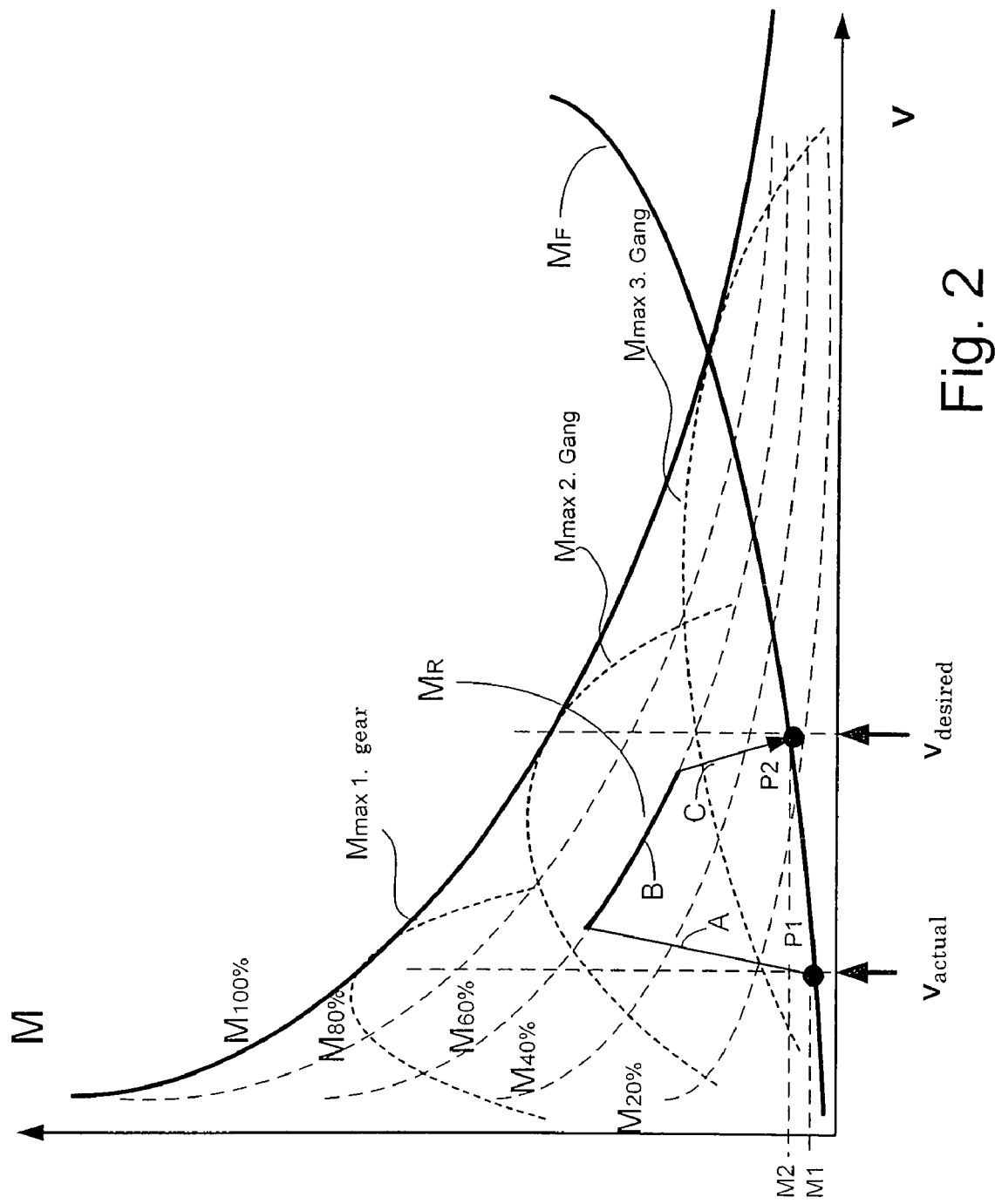
FIG. 2 is a diagram for the detailed explanation of the method of operation of an embodiment of the present invention.

FIG. 2 shows a potential desired wheel torque course $M_R$ which is required for an acceleration operation from a low actual vehicle velocity $v_{actual}$ to a higher desired vehicle velocity $v_{desired}$.

In the functional module of the driver assistance system 3, the desired wheel torque course $M_R$ required for reaching the desired vehicle velocity $v_{desired}$ is determined, for example, by means of the following steps:

1. Determination of the wheel torque M2 required for keeping the desired vehicle velocity $v_{desired}$ constant (steady-state operation), preferably by taking into account a characteristic normal-resistance curve $M_F$, by which an estimated interfering torque is reflected, for example, as a result of a slope.

2. Determination of a wheel torque reserve in the form of the difference between the velocity-dependent maximally possible wheel torque course $M_{100\%}$ and the wheel torque M2 required for keeping the desired vehicle velocity constant. The maximally possible wheel torque course $M_{100\%}$ in the form of the known tractive power hyperbolas for the constant power is obtained from the ratio of the constant maximal drive power to the vehicle velocity v.

3. Determination of the desired wheel torque course $M_R$ as the sum of the wheel torque 2 and a percentage of the wheel torque reserve. This also results in a wheel torque hyperbola over the vehicle velocity v. This wheel torque hyperbola is proportional to the reciprocal value of the vehicle velocity v and determining for the desired wheel torque course $M_R$. At least the main part B of the desired wheel torque course $M_R$ is therefore equal to this wheel torque hyperbola. The entire desired wheel torque course $M_R$ could also be equal to this wheel torque hyperbola between the actual vehicle velocity $v_{actual}$ and the desired vehicle velocity $v_{desired}$. However, in this case, comfort problems may occur as a result of sudden changes of the desired wheel torque at the start and at the end of the desired wheel torque course.

4. For increasing comfort, the desired wheel torque course $M_R$ is composed of a starting section A, a main section B and an end section C, the starting section A and the end section C representing transition sections with finite gradients. The starting point P1 of the desired wheel torque course $M_R$ is the wheel torque M1 required for keeping the actual vehicle velocity $v_{actual}$ constant, preferably also while taking the characteristic normal resistance curve $M_K$ into account. The end point P2 of the desired wheel torque course $M_R$ is the wheel torque M2 required for keeping the desired vehicle velocity $v_{desired}$ constant.

The desired wheel torque quantity is also any quantity which is directly proportional to the wheel torque, such as the tractive power or the vehicle acceleration. The hyperbola-type desired predefinition is essential which is proportional to the reciprocal value of the vehicle velocity. In tests, the resulting vehicle behavior was found particularly comfortable because it corresponds to the expectations according to physical conditions learned by experience. Furthermore, unless the fuel consumption or comfort demands require a limitation, the wheel torque reserve, as described above, is utilized as much as possible in order to achieve a rapid adjusting of the new desired vehicle velocity.

Summarizing, as a result of the invention, the comfort as well as the control speed of a driver assistance system for controlling longitudinal dynamics are optimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinal dynamics control system for motor vehicles arranged to cause adjustment of an actual vehicle velocity to a desired vehicle velocity, comprising:
   a functional module arranged to receive actual vehicle velocity information and desired vehicle velocity information, and to output a signal to at least one vehicle regulating system to obtain a desired wheel torque course,
   wherein said functional module is programmed to determine the desired wheel torque course for reaching the desired vehicle velocity based on predefined data relating vehicle velocity to wheel torque, and at least in a section of the desired wheel torque course, the desired wheel torque course is proportional to a reciprocal of the vehicle velocity.

2. The longitudinal dynamics control system according to claim 1, wherein
in at least the section of the desired wheel torque course in which the desired wheel torque course is proportional to the reciprocal of vehicle velocity, the desired wheel torque course is selected between a maximum possible desired wheel torque course and a wheel torque required for keeping the desired vehicle velocity constant.

3. The longitudinal dynamics control system according to claim 1, wherein
the desired wheel torque course includes a starting section, a main section and an end section, and
the starting section and the end section are transition sections with constant gradients.

4. The longitudinal dynamics control system according to claim 2, wherein
the desired wheel torque course includes a starting section, a main section and an end section, and
the starting section and the end section are transition sections with constant gradients.

5. The longitudinal dynamics control system according to claim 1, wherein
a starting point of the desired wheel torque course is a wheel torque required for keeping the actual vehicle velocity constant.

6. The longitudinal dynamics control system according to claim 3, wherein
a starting point of the desired wheel torque course is a wheel torque required for keeping the actual vehicle velocity constant.

7. The longitudinal dynamics control system according to claim 4, wherein
a starting point of the desired wheel torque course is a wheel torque required for keeping the actual vehicle velocity constant.

8. The longitudinal dynamics control system according to claim 5, wherein
an end point of the desired wheel torque course is a wheel torque required for keeping the desired vehicle velocity constant.

9. The longitudinal dynamics control system according to claim 6, wherein
an end point of the desired wheel torque course is a wheel torque required for keeping the desired vehicle velocity constant.

10. The longitudinal dynamics control system according to claim 7, wherein
an end point of the desired wheel torque course is the wheel torque required for keeping the desired vehicle velocity constant.

11. The longitudinal dynamics control system according to claim 1, wherein
the desired vehicle velocity is a predetermined constant vehicle velocity.

12. A method for longitudinal dynamics control for motor vehicles, comprising the acts of:
receiving in a functional module actual vehicle velocity information and desired vehicle velocity information;
determining a desired wheel torque course for reaching the desired vehicle velocity based on predefined data relating vehicle velocity to wheel torque, wherein at least in a section of the desired wheel torque course, the desired wheel torque course is proportional to a reciprocal of the vehicle velocity; and
outputting a signal to at least one vehicle regulating system to obtain a desired wheel torque course to cause adjustment of the actual vehicle velocity to the desired vehicle velocity.

13. The method for longitudinal dynamics control according to claim 12, wherein
in at least the section of the desired wheel torque course in which the desired wheel torque course is proportional to the reciprocal of vehicle velocity, the desired wheel torque course is selected between a maximum possible desired wheel torque course and a wheel torque required for keeping the desired vehicle velocity constant.

14. The method for longitudinal dynamics control according to claim 12, wherein
the desired wheel torque course includes a starting section, a main section and an end section, and
the starting section and the end section are transition sections with constant gradients.

15. The method for longitudinal dynamics control according to claim 13, wherein
the desired wheel torque course includes a starting section, a main section and an end section, and
the starting section and the end section are transition sections with constant gradients.

16. The method for longitudinal dynamics control according to claim 15, wherein
a starting point of the desired wheel torque course is a wheel torque required for keeping the actual vehicle velocity constant.

17. The method for longitudinal dynamics control according to claim 16, wherein
an end point of the desired wheel torque course is a wheel torque required for keeping the desired vehicle velocity constant.

* * * * *